June 17, 1952 R. E. COLLIS ET AL 2,600,482

ELECTRIC DELAY CIRCUIT

Filed May 13, 1948

INVENTORS: R. E. COLLIS
J. W. DEHN

BY J W Schmied
ATTORNEY

Patented June 17, 1952 2,600,482

UNITED STATES PATENT OFFICE 2,600,482

ELECTRIC DELAY CIRCUIT

Raymond E. Collis, Summit, N. J., and Joseph W. Dehn, Great Neck, N. Y., assignors to Bell Telephone Laboratories, Incorporated, New York, N. Y., a corporation of New York Application May 13, 1948, Serial No. 26,808

8 Claims. (Cl. 171—97)

This invention relates to electric delay circuits and more particularly to delay circuits in which the delay interval may be changed after timing has been started.

In various electrical systems such as those employed, for example, in telephony, it is frequently necessary to introduce time delay intervals between the operation of one element of the circuit and another element thereof. Many means have been devised to accomplish this result, some of the more satisfactory types utilizing the inherent delay in the charging or discharging of a condenser to control the time at which a unidirectional current flow device such as a rectifier, vacuum tube or gas-filled tube will conduct sufficient current to operate a relay. Methods have also been propounded for adjusting such delay intervals, comprising in most cases either an adjustable resistance or an adjustable capacitance.

However, the necessity arises in various applications of time delay circuits to vary the time delay interval after the timing period has started. For instance, in automatic telephone switching the interval between the time a trunk is seized and the time the trunk is used is dependent upon the time the sender requires to forward the requisite information. A time delay circuit may be adjusted for a certain delay interval commencing at the time the trunk is seized, and upon the receipt of an indication from the sender that a lesser delay period is required, it is desirable to be able to reduce the interval for which the time delay circuit has been preset. In other applications it may be desirable to extend the period after the timing interval has started.

The present invention proposes circuits adapted to provide both a delay interval and means to vary that time interval after the commencement thereof. In general, the circuits utilize the time delay of a resistance-capacitance network to regulate the time at which a substantially unidirectional current flow device will be rendered sufficiently conductive to operate a relay or other current-sensitive control device. In each of the preferred embodiments presented herein, the unidirectional current flow device is normally "biased" at a certain potential, i. e., there is a certain preselected potential difference between the main electrodes of the device. Means are provided for changing this interelectrode potential difference operable either before or after the timing period has started to either lengthen or shorten such period. The means comprises, in the depicted embodiments, a switch operable to either increase or decrease the biasing potential difference between the main electrodes of the unidirectional current flow device, thus requiring either a lesser or greater accumulation of charge on the condenser to cause the device to become sufficiently conductive to operate a relay. In this manner a proportionally lesser or greater time delay interval is obtained.

The utilization of a conventional "dry" rectifier, of a gaseous diode, of a vacuum tube and of a gaseous triode as the unidirectional current flow device, and further details of the circuits will be more fully understood from the ensuing detailed description made in reference to the accompanying drawings in which.

Figure 1:
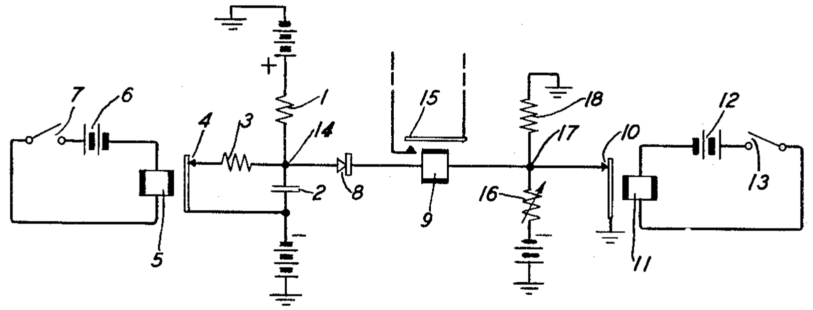
Fig. 1 represents a circuit arranged in accordance with the invention in which a dry rectifier is used as the unidirectional current flow device.

Referring now to Fig. 1, a source of positive potential is connected through resistor 1 to one side of condenser 2, the other side of which is connected to a source of negative potential. A resistance 3 shunts condenser 2 under the control of contacts 4 of start relay 5 which is energized by battery 6 upon the closure of switch 7. A dry rectifier 8 of any well-known type and a relay 9 are connected between one plate of condenser 2 and ground through contact 10 of relay 11 which is energized by battery 12 upon the closure of switch 13. The value of resistor 1 is high compared to that of resistor 3, and therefore in the depicted unoperated condition of the circuit, the major portion of the potential drop occurs across resistor 1. The values of the two resistances are so proportioned that at this time there is a negative potential relative to ground at point 14 adjacent the condenser 2 and thus substantially no current will flow through relay 9 since rectifier 8 is a unidirectional current flow device presenting a low impedance to conventional current flow therethrough in a right-hand direction, and presenting a high impedance to conventional current flow therethrough in a left-hand direction. Upon operation of start relay 5 through the closure of switch 7, the shunt around condenser 2 is removed and the condenser will then commence to charge through resistor 1. When the upper plate of condenser 2 reaches a potential positive relative to ground potential, rectifier 8 will conduct and when the upper plate of condenser 2 reaches a potential sufficiently positive relative to ground potential to cause sufficient current to flow to meet the minimum operating requirements of relay 9, relay 9 will operate thereby closing contacts 15 which may control an external load circuit. This normal delay interval between the operation of relay 5 and the operation of relay 9 is proportional to the product of the resistance 1 and the capacitance 2 and therefore may be preselected by means of adjusting the value of either.

In order that this preselected delay interval may be changed after the timing period has commenced, a source of negative potential is connected through adjustable resistor 16 to the rectifier 8—relay 9 series circuit at point 17. This potential normally has no effect on the operation of relay 9 inasmuch as point 17 is grounded through contacts 10 of relay 11. In order that the potential at point 17 may be adjustable by means of resistor 16, resistor 18 and ground may be connected at point 17. Upon operation of biasing relay 11 through the closure of switch 13 contacts 10 break and this ground is removed. A negative potential is thereby placed on the circuit at point 17 and in order for the rectifier 8 to become conducting, it is only necessary for the potential on condenser 2 to be positive relative to the potential at point 17. Therefore, the condenser need not accumulate as high a charge and the timing period is thereby reduced. The extent of the reduction is of course dependent upon the parameters of the circuit, and may be adjusted by changing the value of the biasing negative potential at point 17 which may be accomplished by adjusting the value of resistance 16. Conversely, if it is desired that the timing period be lengthened after the interval is started, a positive biasing potential may be applied at point 17, or contacts 10 may be arranged to "make" upon energization of relay 11 and thus apply ground after timing is started. It is also apparent in the circuit of Fig. 1 that if biasing relay 11 is normally operated, release of relay 11 subsequent to the operation of relay 5 will lengthen the timing period.

Deenergization of relay 5 will cause contacts 4 to release to again place resistance 3 in shunt of condenser 2 to allow condenser 2 to discharge to the normal unoperated state of the circuit, and to thereby result in the release of relay 9.

It is believed to be evident that rectifier 8 might be replaced by a two-electrode gas-filled tube. Timing in a circuit modified in this fashion would depend upon the time required to charge condenser 2 to a potential sufficient to cause the tube to break down so that the reduced impedance thereof would permit sufficient current to pass to operate relay 9. A subsequent operation of relay 11 removing ground from the circuit would change the interelectrode biasing potential on the tube thus either reducing or increasing the degree to which condenser 2 must be charged in order for the tube to fire, and thus accordingly reducing or increasing the timing interval as above described.

Figure 2:
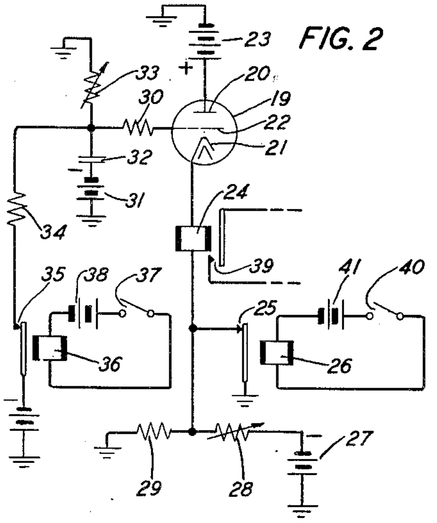
Fig. 2 represents a circuit in which a vacuum triode is used as such a device.

Fig. 2 represents a circuit arranged to accomplish the desired variations in time delay interval in which a vacuum tube has been utilized as the unidirectional current flow device. This vacuum tube 19 has been depicted as a triode having an anode 20, a cathode 21, and a grid 22. A source of positive potential 23 is connected to the anode 20. The cathode 21 is connected through the winding of relay 24 to ground through contacts 25 of relay 26 and also through a voltage divider comprising a source of negative potential 27, an adjustable resistor 28, resistor 29 and ground. The grid 22 of vacuum tube 19 is connected through current limiting resistor 30 to a series circuit comprising a source of negative potential 31, a condenser 32, an adjustable resistor 33 and ground. Resistor 34 is placed in shunt of condenser 32 under the control of contacts 35 of relay 36. Under the depicted unoperated conditions, tube 19 is biased so as to be nonconducting. Upon the closure of switch 37, relay 36 will be energized by battery 38 to break contacts 35 to remove the shunt from condenser 32. The condenser will then commence to charge through resistance 33, the rate of such charging being preselectable either through adjustment of the value of condenser 32 or resistance 33. When, in the depicted embodiment, the condenser is charged to a point near ground potential, depending upon the characteristics of tube 19, tube 19 will conduct current through its output circuit including anode 20, cathode 21, relay 24, contacts 25, ground and to battery 23. Relay 24 will then operate to close contacts 39 to control an external load circuit.

In order to reduce the preselected time delay after the interval has commenced, switch 40 may be closed to cause battery 41 to energize relay 26, to thereby open contact 25 and remove the ground from the circuit. The potential then applied to the cathode of tube 19 will then be more negative than ground and condenser 32 will have to charge to a lesser degree than previously to build up a sufficient potential on grid 22 to render the tube conducting. A lesser delay interval will thus result.

The reduction in the delay between the time at which relay 36 is operated until relay 24 will operate, may be changed by adjusting resistance 28. As was discussed in regard to Fig. 1, the timing period may be lengthened after the interval has been commenced either by having relay 26 normally operated and releasing it to increase the timing interval, or by providing relay 26 with "make" rather than "break" contacts, or by providing a source of positive potential 27 rather than the depicted negative source. Other modifications will be obvious to those skilled in the art.

Release of relay 36 will replace the shunt around condenser 32 which will discharge through resistance 34, and the circuits will return to their unoperated condition releasing relay 24.

Figure 3:
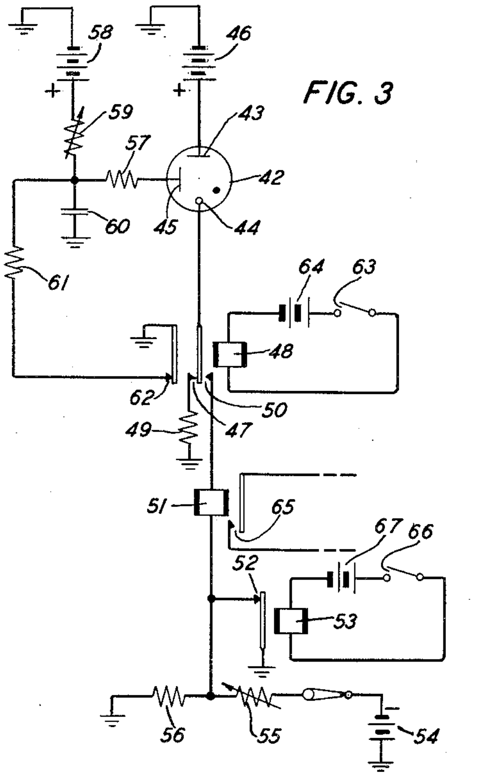
Fig. 3 depicts an embodiment of the invention in which a gas-filled tube is used.

Fig. 3 represents a circuit arranged to provide a variable time delay interval in which a gas-filled triode has been utilized as the unidirectional current flow device. The depicted double-gap cold-cathode gas-filled tube 42 is provided with an anode 43, a cathode 44 and a starter electrode 45, though it is to be understood that a gas tube of the thyratron or other type may be used. A source of positive potential 46 is connected to anode 43. When relay 48 is unoperated, the cathode 44 is connected through back contacts 47 of relay 48, through resistor 49 and to ground. This resistor 49 and the ground potential are provided to stabilize the potential at the cathode to prevent stray capacitance or stray leakage from causing the cathode potential to vary. Cathode 44 is connectable, by means of front contacts 50 of relay 48, through the winding of relay 51 to ground through contacts 52 of relay 53. The cathode is also connected through contacts 50 of relay 48, winding of relay 51, and to a voltage divider comprising a source of negative potential 54, an adjustable resistor 55, resistor 56 and to ground.

Starter electrode 45 of gas tube 42 is connected through current limiting resistor 57 to a series circuit comprising a source of positive potential 58, adjustable resistor 59, condenser 60 and ground. Resistor 61 is placed in shunt of condenser 60 under control of contacts 62 of relay 48. Under the depicted unoperated condition, tube 42 is biased so as to be non-conducting. Upon the closure of switch 63, battery 64 will energize start relay 48 which will break contacts 62 to remove the shunt from condenser 60, and will also transfer the cathode lead from contacts 47 to contacts 50 to place a potential on the cathode substantially equal to ground. The bias potential on the tube at this time is such that there will be a certain delay interval before condenser 60 will have attained a sufficient charge to apply the requisite potential on starter electrode 45 to cause tube 42 to fire. With a tube of given characteristics, this period may be preset by the adjustment of either condenser 60 or resistance 59. When tube 42 becomes conductive, current will flow through the output circuit of that tube to operate relay 51 thus closing contacts 65 to control an external load circuit.

To vary the timing interval after timing has started, the bias potential may be shifted, a shift increasing the potential difference across the main gap of the tube shortening the timing period, and, conversely, a shift decreasing the potential difference across the main gap lengthening the timing period. This is accomplished in the circuit of Fig. 3 in much the same manner as that described in relation to the circuits of Figs. 1 and 2. Upon the closure of switch 66, battery 67 will energize relay 53 to "break" contacts 52 and thus remove the ground. A potential more negative than ground will then be placed on cathode 44 thereby shifting the bias on tube 42 so that it will fire with a lesser potential on control electrode 45 and thus will be rendered conductive more rapidly. Resistance 55 may be adjusted to vary this decreased interval, and, as before described, positive battery may be substituted at 54, or relay contacts 52 may be modified to cause the period of delay to be lengthened.

In order to extinguish gas-filled tubes, it is necessary to reduce the potential difference between the anode and cathode to a point below the sustaining voltage thereof. Therefore, in the circuit of Fig. 3, upon the release of start relay 48 not only is the shunting resistance 61 replaced around condenser 60, but also contacts 50 are broken to cause the tube 42 to extinguish and the relay 51 to release. It is to be understood, however, that any other well-known means of reducing the anode potential to extinguish the tube may be used.

It will be noted that in each of the depicted circuits, if a sufficient interval has elapsed before the biasing relay is operated, operation of the biasing relay will cause the unidirectional current flow device to conduct practically instantaneously. For instance, if the parameters of the circuits be such that with the biasing relay unoperated, 0.8 second will elapse between the operation of the start relay and the operation of the circuit control relay, and with the biasing relay operated there will be but, for example, a 0.4 second delay, operation of the biasing relay after 0.4 second has elapsed, but before the full 0.8 second has expired, will cause the unidirectional current flow device to operate immediately.

Although it is to be understood that the following parameters are purely exemplary and may be varied to meet the requirements of any particular embodiment of the invention, the various elements of the several depicted systems may be of the following values: Fig. 1: resistor 1, 10,000 ohms; capacitor 2, 10 microfarads; resistor 3, 100 ohms; resistor 16, 800 ohms; resistor 18, 200 ohms; positive battery, positive 130 volts; negative batteries, negative 130 volts. Fig. 2: tube type 6L6; resistor 30, 0.1 megohm; resistor 33, 1 megohm; capacitor 32, 10 microfarads; resistor 34, 1000 ohms; resistors 28 and 29, 300 ohms; positive battery, positive 130 volts; negative battery, negative 100 volts. Fig. 3: tube type 313-CA; resistor 57, 0.1 megohm; resistor 59, 1 megohm; capacitor 60, 1 microfarad; resistor 61, 1000 ohms; resistor 49, 10 megohms; resistor 55, 2200 ohms; resistor 56, 4250 ohms; positive battery, positive 130 volts; negative battery, negative 48 volts.

It will be observed that the values of the resistance-capacitance network in each case may be varied to provide any desired time constant.

Modification of the above-described circuits may also be made within the scope of the invention to provide the same results with alternating current, using half-wave rectification and placing a filter around the winding of the load controlling relay.

It is to be understood that the above depicted and described circuits are but representative of the invention and are not to be interpreted in a limiting sense since many possible modifications of the circuit may be made within the scope of the appended claims.

What is claimed is:

1. In a time delay circuit, a dry rectifier having an anode and a cathode, a switch, a first source of potential connected to the cathode of said rectifier through said switch, a resistor, a second source of potential negative relative to said first potential connected to the cathode of said rectifier through said resistor, a series circuit comprising a third source of potential positive relative to said first and said second sources, a second resistor, a capacitor, and a fourth source of potential negative relative to said first source, a connection between the anode of said rectifier and said series circuit at a point between said second resistor and said capacitor, means for operating said switch, and means operative in response to current flow through said rectifier.

2. A time delay apparatus comprising a condenser, a resistor, a charging circuit for said condenser including said resistor, a unidirectional current conducting device having two terminals, means connecting one of said terminals to a point in said charging circuit intermediate said resistor and said condenser, a load device, means for applying a biasing potential through said load device to the other terminal of said unidirectional current conducting device, a voltage source, and a normally closed switch connecting said voltage source to said other terminal of said unidirectional current conducting device through said load device.

3. A time delay apparatus comprising a condenser, a resistor, a charging circuit for said condenser including said resistor and means for connecting said resistor and said condenser in series, a unidirectional current conducting device having two terminals, means connecting one of said terminals to a point in said charging circuit intermediate said resistor and said condenser, a load device, means for applying a biasing potential through said load device to the other terminal of said unidirectional current conducting device, a voltage source, a normally closed switch connecting said voltage source to said other terminal of said unidirectional current conducting device through said load device, and means for opening said switch.

4. A time delay apparatus comprising a switch, a condenser, a resistor, a charging circuit for said condenser controlled by said switch including said resistor, a unidirectional current conducting device having two terminals, means connecting one of said terminals to a point at said charging circuit intermediate said resistor and said condenser, a load device, means for applying a biasing potential through said load device to the other terminal of said unidirectional current conducting device, a voltage source, a normally closed switch connecting said voltage source to said other terminal of said unidirectional current conducting device through said load device, and means for opening said normally closed switch.

5. A time delay apparatus comprising a unidirectional current conducting device and a load connected in series therewith, means for applying an initial voltage to one side of said device, means for slowly increasing said initial voltage comprising a condenser, a resistor and a charging circuit for said condenser including said resistor, a normally closed switch, means including said switch for applying another initial voltage to the other side of said device through said load, and means for applying a different voltage to the said other side of said device comprising a voltage source connected to said other side of said device through said load and means for opening said switch.

6. A time delay apparatus comprising a unidirectional current conducting device and a load connected in series therewith, means for applying a first initial voltage to one side of said device, a normally closed switch, means including said normally closed switch for applying a second initial voltage to the other side of said device through said load for initially biasing said device non-conducting, means for slowly increasing said first initial voltage for rendering said device conductive after a delay interval comprising a condenser, a resistor and a charging circuit for said condenser including said resistor, and means for changing said second initial voltage comprising a voltage source connected to said other side of said device through said load and means for opening said switch.

7. A time delay apparatus comprising a unidirectional current conducting device and a load connected in series therewith, means for applying a first initial voltage to one side of said device, a normally closed switch, means including said normally closed switch for applying a second initial voltage to the other side of said device through said load for initially biasing said device non-conducting, means for slowly increasing said first initial voltage for rendering said device conductive after a delay interval comprising a condenser, a resistor in series with said condenser and a charging circuit for said condenser including said resistor, and means for changing said second initial voltage comprising a voltage source connected to said other side of said device through said load and means for opening said switch.

8. A time delay apparatus comprising a unidirectional current conducting device and a load connected in series therewith, means for applying a negative initial voltage to one side of said device, a normally closed switch, means including said normally closed switch for applying an initial voltage of ground to the other side of said device through said load for initially biasing said device non-conducting, means for slowly increasing said negative initial voltage to a positive value for rendering said device conductive after a delay interval comprising a condenser, a resistor in series with said condenser, and a charging circuit for said condenser including said resistor, and means for changing said ground initial voltage for varying said delay interval comprising a source of voltage other than ground and a resistor serially connected to said other side of said device through said load and means for opening said switch.

RAYMOND E. COLLIS.
JOSEPH W. DEHN.

REFERENCES CITED

The following references are of record in the file of this patent:

UNITED STATES PATENTS

| Number | Name | Date |
|---|---|---|
| 1,762,811 | Charlton | June 10, 1930 |
| 1,917,418 | Almquist | July 11, 1933 |
| 2,040,425 | Biach | May 12, 1936 |
| 2,114,016 | Dimond | Apr. 12, 1938 |
| 2,360,721 | Rose | Oct. 17, 1944 |
| 2,370,727 | Holden | Mar. 6, 1945 |
| 2,372,005 | Kinsman | Mar. 20, 1945 |
| 2,445,051 | Wilson | July 13, 1948 |